United States Patent [19]

Ellis

[11] Patent Number: 5,012,688

[45] Date of Patent: May 7, 1991

[54] SIZING APPARATUS AND PROPORTIONAL SPACING MECHANISM

[76] Inventor: Malcolm P. Ellis, Ellis Farms, Rte. 227, P.O. Box R, Ashland, Me. 04732

[21] Appl. No.: 547,949

[22] Filed: Jul. 3, 1990

Related U.S. Application Data

[62] Division of Ser. No. 314,953, Feb. 24, 1989.

[51] Int. Cl.5 .......... F16H 21/16

[52] U.S. Cl. .......... 74/89.15; 74/424.8 R

[58] Field of Search .......... 74/89.15, 424.8 R; 209/668, 676

[56] References Cited

U.S. PATENT DOCUMENTS

| | | | |
|---|---|---|---|
| Re. 21,376 | 2/1940 | Walma | 126/204 |
| 282.719 | 8/1883 | Gunckel | 209/668 |
| 1,325,505 | 12/1919 | Bong | 209/676 X |
| 1,647,816 | 11/1927 | Riddell | 209/668 |
| 2,335,164 | 11/1943 | Wayland et al. | 209/667 X |
| 2,365,822 | 12/1944 | Jones | 209/668 |
| 2,425,478 | 8/1947 | Lawton et al. | 209/668 |
| 2,527.019 | 10/1950 | Marbury, Jr. | 74/424.8 R |
| 2,674,453 | 4/1954 | Hummert | 74/424.8 R X |
| 2,853,793 | 9/1958 | Ripp et al. | 33/663 |
| 3,367,494 | 2/1968 | Peterson | 209/668 |
| 3,640,138 | 2/1972 | Hahn et al. | 74/89.15 |
| 4,405,050 | 9/1983 | Fenton, Jr. et al. | 209/673 X |
| 4,566,345 | 1/1986 | Erikson et al. | 74/89.15 |
| 4,627,541 | 12/1986 | Johnson | 209/668 |
| 4,635,492 | 1/1987 | Uebelhart | 74/89.15 |
| 4,651,581 | 3/1987 | Svensson | 74/89.15 |
| 4,793,197 | 12/1988 | Petrovsky | 74/89.15 |

FOREIGN PATENT DOCUMENTS

| | | | |
|---|---|---|---|
| 620247 | 4/1927 | France | 209/662 |
| 59-9350 | 1/1984 | Japan | 74/424.8 R |
| 1227263 | 4/1986 | U.S.S.R. | 209/662 |
| 15905 | of 1886 | United Kingdom | 209/667 |

*Primary Examiner*—Allan D. Herrmann
*Assistant Examiner*—Scott Anchell
*Attorney, Agent, or Firm*—Daniel H. Kane

[57] ABSTRACT

A roller conveyor bed is formed by a plurality of driven conveyor spools or rollers rotating in the same direction for conveying and sorting objects. The conveyor rollers define a substantially common conveyor plane along the upper surfaces of the conveyor rollers and are selectively spaced apart for selectively passing objects through the selective spaces between conveyor rollers thereby sorting the objects by a size dimension. An anti-pinch surface is positioned adjacent to each of the conveyor rollers on the downstream side of the conveyor roller with reference to the conveying direction. Each surface is positioned below the conveyor plane and provides an anti-pinch surface which substantially shields the downstream side of the adjacent conveyor roller where the roller surface is turning in a downward direction. The conveyor rollers are spaced apart so that the anti-pinch surface shielding the downstream side of one conveyor roller and the upwardly turning surface of the next spaced apart roller define the selective space for passing and sorting objects. The anti-pinch surface is an elongate stationary curved surface facing convex side upward or a second roller of substantially smaller diameter abutting the downstream side of the conveyor roller. A proportional spacing mechanism is coupled to the spools or rollers for variable spacing of the rollers while maintaining equal spacing or proportional spacing between the rollers.

2 Claims, 6 Drawing Sheets

SIZING APPARATUS AND PROPORTIONAL SPACING MECHANISM

This is a division of application Ser. No. 314,953, filed Feb. 24, 1989.

TECHNICAL FIELD

This invention relates to a new sizing apparatus for grading, sorting, separating or classifying objects by a size dimension. The invention is particularly applicable for sizing, separating and sorting potatoes and other vegetables and fruits having an elongate shape or configuration. The sizing apparatus also incorporates a new proportional spacing mechanism.

BACKGROUND ART

In the conventional spool type sizer or sizing machine, potatoes or other fruits or vegetables ride along a roll conveyor formed by a bed of spools or rollers all rotating in the same direction. The spacing between the rollers is adjusted for selectively passing and sorting the potatoes or other objects according to a size dimension. For elongate fruits, vegetables or other objects the selective sorting is based upon the short axis width or diameter. The spacing of the rollers is adjusted so that small diameter objects pass through the selective spaces between the rollers in a first section of the roll conveyor to a first bin or first receiving conveyor. The spacing between rollers is increased in the next section and the intermediate size objects fall into a second bin or on to a second receiving conveyor. Finally the larger size objects which do not pass through the selective spaces between rollers are carried along the top of the roll conveyor to a third bin or third receiving conveyor destination.

In some of the existing sizing machines, the rollers or spools rotate at stationary locations while in other existing devices the rollers or spools actually move along as a conveyor while also rotating. Spool-type roller conveyor structures are described for example in the Peterson U.S. Pat. No. 3,367,494. In the Peterson machine the selective spacing between rollers may be proportionally adjusted by means of a composite threaded shaft. Shaft sections of different pitch threads and different thread directions engage the respective roller mounts for maintaining equal or proportional spacing. The roller mounts slide on rails for variable spacing upon turning the shaft handle.

Spool type sizers with rolls all turning in the same direction may be obtained for example from the Better Built Potato Seed Cutter Company, 1649 West 3300 South Street, Salt Lake City, Ut 84119 and the Double L Manufacturing Co., American Falls, Id 83211. A variable spacing roller sizer for diameter grading in which the rollers expand in spacing as they advance along a conveyor for sorting by size is available from Kerian Machines, Inc., Highway 81 South, P.O. Box 311, Grafton, ND 58237.

In these rotating spool or roller sizing machines with rollers rotating in the same direction, separating and sorting of potatols and similar objects takes place as the objects fall down and pass between a pair of rollers when the size dimension of the object corresponds to the spacing between the rollers. A disadvantage of this arrangement is that the potato or other object, typically a fruit or vegetable, always encounters an upward moving roller or spool surface on one side and a downward moving roller or spool surface on the other side. These counter moving surfaces of adjacent rollers produce a pinch effect which can bruise, damage or crush the fruits or vegetables in the process of sizing.

OBJECTS OF THE INVENTION

It is an object of the present invention to provide an anti-pinch sizing apparatus which advances fruits, vegetables and similar objects over a roller conveyor for size grading and sorting without bruising, damaging or crushing the objects.

Another object of the invention is to provide a roller conveyor type sizing apparatus in which the selective space between rollers for passing and sorting objects is not bounded by downwardly turning surfaces to avoid the pinch effect yet without interfering in the conveying action. The present invention seeks to avoid opposing a downwardly turning surface and an upwardly turning surface at the selected spaces between rollers.

A further object of the invention is to provide a new proportional spacing mechanism for variably adjusting the spacing between rolls of a roller conveyor while maintaining equal spacing or proportional spacing between the rollers.

DISCLOSURE OF THE INVENTION

In order to accomplish these results the present invention provides an improved sizing apparatus having a roller conveyor bed of a plurality of driven conveyor spools or rollers rotating in the same direction for conveying objects to be sorted. The conveyor rollers define a substantially common conveyor plane along the upper surfaces of the conveyor rollers. The conveyor rollers are selectively spaced apart for selectively passing objects through the selective spaces between conveyor rollers thereby sorting the objects by a size dimension.

According to the present invention an anti-pinch surface is positioned adjacent to the downstream side of each of the conveyor rollers with reference to the conveying direction. Each anti-pinch surface is positioned below the conveyor plane so that it avoids interference with the conveying action along the conveyor plane. A feature of the anti-pinch surface is that it substantially shields the downstream side of the adjacent conveyor roller where the roller surface is turning in a downward direction. The anti-pinch surface shielding the downstream side of one conveyor roller and the upwardly turning surface of the next spaced apart downstream roller define the selective space for spacing and sorting objects according to a size dimension.

In one example embodiment the anti-pinch surface is an elongate stationary curved surface with the convex side facing upward or outward and with a straight leading edge positioned adjacent to and along the downwardly rotating surface of the shielded conveyor roller. The trailing end of the convex surface extends between the shielded conveyor roller and the next spaced apart downstream conveyor roller for defining the selective space for passing and sorting objects. In this example embodiment, the sizing or sorting space is therefore bounded by a stationary surface and an upwardly turning surface, thereby effectively avoiding the pinch effect which may bruise, damage or crush fruits or vegetables.

The elongate stationary curved or convex surface may be pivotally mounted along a pivot axis substantially coinciding with the leading edge of the stationary anti-pinch surface. The curved surface may therefore be pivotally adjusted for varying the location of the trailing end thereby varying the dimension of the selective space between conveyor rollers.

In the preferred example embodiment the anti-pinch surface is a second roller abutting the shielded conveyor roller on the downstream side of the shielded conveyor roller with reference to the conveying direction. The second roller thereby rotates in the opposite direction from the shielded conveyor roller and presents an upwardly turning surface on the downstream side of the second roller facing the upwardly turning surface at the next spaced apart downstream roller. The selective spaces for passing and sorting objects are therefore defined at both sides by upwardly turning spaced apart surfaces.

A feature of the invention is that the second roller has a diameter substantially smaller than the diameter of the shielded conveyor roller so that the upper surface of the second roller does not interfere in the conveyor action at the conveyor plane. It is large enough however to effectively shield the downwardly turning surface of the conveyor roller and avoid the pinch effect. The second diameter of the second roller or shielding roller is no greater than one-half the diameter of the shielded conveyor roller and preferably in the range of approximately one-sixth to one-third of the diameter of the shielded roller. The preferred size ratio is approximately one-quarter the diameter of the shielded conveyor roller.

The invention therefore contemplates an improved sizing apparatus formed by a plurality of pairs of rollers each comprising a driven conveyor roller and an abutting anti-pinch roller. The conveyor rollers rotate in the same direction for conveying objects to be sorted and define a substantially common conveyor plane along the upper surfaces of the conveyor rollers.

Each anti-pinch roller of a pair is formed with a diameter substantially smaller than the diameter of the conveyor roller so that the upper surface of the anti-pinch roller does not interfere in the conveying action at the conveyor plane. The anti-pinch roller of each pair abuts the downstream side of the conveyor roller with reference to the conveying direction and presents an upwardly turning surface on the downstream side of the pair. Thus the selective spaces for passing and sorting objects are bounded by upwardly turning surfaces only.

The invention also provides a new proportional spacing mechanism assembled from a plurality of coupling elements or assemblies coupled respectively at the ends of the conveyor rollers to the roller mounts. More generally, the coupling elements or assemblies such as blocks or slide carriages may be secured to any multiple objects to be variably spaced. Each coupling element is formed with an internally threaded receiver on one side of the coupling element and in fixed relationship to the coupling element, and an elongate externally threaded bolt rotationally supported or held by the coupling element and extending from the other side of the coupling element.

The coupling elements are coupled together with the externally threaded bolt of one engaging the internally threaded receiver of the next adjacent coupling assembly effectively forming a multi-element shaft for example along one or both sides of the roller conveyor bed. The bolts are formed with an internal channel with a length of non-circular cross section so that a rod of complementary non-circular cross section may extend through the bolts and engage the bolts. Rotation of the rod rotates the bolts relative to the receivers fixed to the coupling elements and respective rollers or other objects thereby spacing all of the couplings or coupling elements and respective rollers or other objects proportionally from a reference position.

A feature and advantage of the proportional spacing mechanism is that the multi-element shaft need not bear the weight of the rollers. Rather a track or weight bearing shaft is provided on each side of the conveyor bed constructed and arranged for slideably bearing the weight of the conveyor rollers or other objects. The coupling elements of the proportional spacing mechanism are coupled to the ends of the respective conveyor rollers or roller mounts without bearing the weight of the rollers. Furthermore the threads of the coupling elements including the bolts and sleeves of each multi-element shaft all turn in the same direction and have the same thread size so that they are interchangeable. Furthermore, the coupling elements may be assembled for spacing any number of sizing rolls or other objects to be variably, spaced.

Other objects, features and advantages of the invention are set forth in the following specification and accompanying drawings.

DESCRIPTION OF PREFERRED EXAMPLE EMBODIMENTS AND BEST MODE OF THE INVENTION

Figure 1:
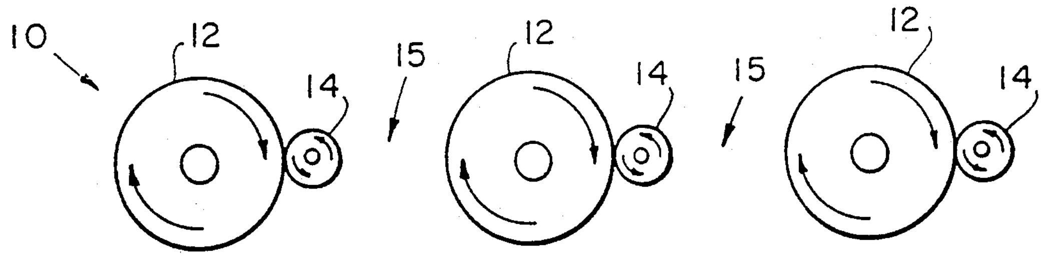
FIG. 1 is a fragmentary diagrammatic side view of a portion of a roll bed having spaced apart roller pairs according to the invention.

A roller conveyor sizing apparatus 10 formed spaced apart pairs of rollers is illustrated diagrammatically in FIG. 1. Each pair consists of a conveyor roller 12 and an abutting anti-pinch roller 14 both of which maY be power driven. The conveyor rollers 12 rotate in the same direction and define the conveyor plane along the upper surfaces of the rollers 12.

The anti-pinch roller 14 of each pair abuts the downstream side of the conveyor roller 12 and shields the downstream side where the surface of the conveyor roller 12 is turning in an upward direction. The anti-pinch roller 14 rotates in the opposite direction from the abutting conveyor roller 12 and presents an upwardly turning surface on the downstream side of the pair. The pairs are spaced apart so that the upwardly turning surfaces on the downstream side of one pair and the upstream side of a spaced downstream pair define selective spaces 15 for passing and sorting objects by a size dimension.

Each anti-pinch roller 14 of a pair has a diameter substantially smaller than the diameter of the abutting conveyor roller 12 so that it does not interfere in conveyor action at the conveyor plane. Generally, the diameter of the anti-pinch roller 14 is no greater than ½ the diameter of the conveyor roller 12 and preferably in the range of approximately 1/6 to ⅓the diameter of the conveyor roller 12. The diameter size of the anti-pinch roller is selected to present a large enough surface for shielding the downstream side of the conveyor roller without interfering in the conveyor plane. The preferred diameter ratio is approximately ¼, that is the diameter of the anti-pinch roller 14 is approximately ¼ the diameter of the conveyor roller 12.

The advantage of the sizing conveyor apparatus configuration 10 of FIG. 1, is that an irregular elongate object such as potato 16 that falls with one end into the selective sizing space 15 will be subject to a lifting action rather than a bruising pinching action. The lifted potato will then progress along the conveyor 10 to the next larger sizing section.

Figure 3:
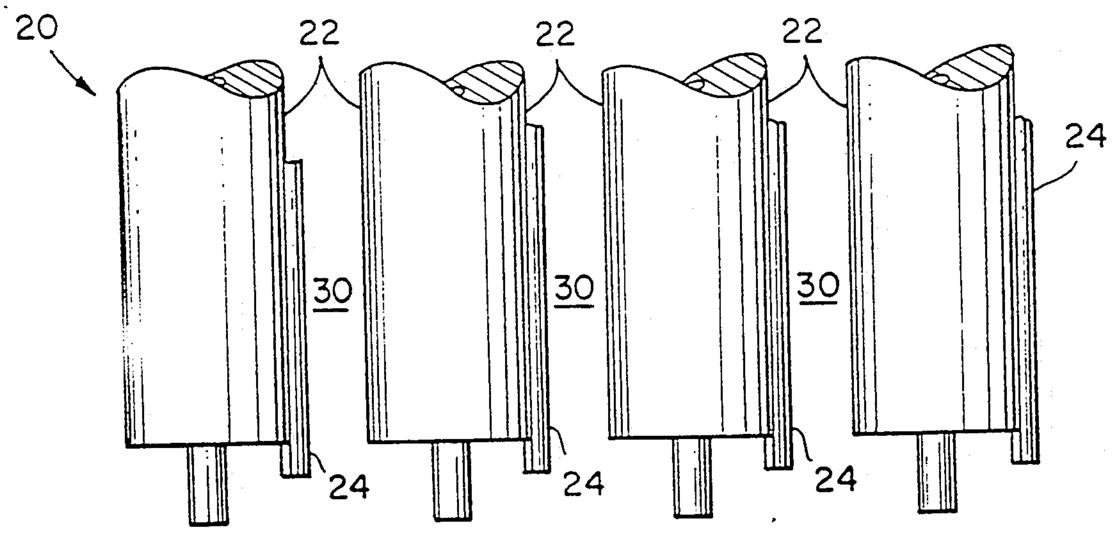
FIG. 3 is a fragmentary diagrammatic plan view of a portion of another roller conveyor bed formed with anti-pinch shields according to the invention.
Figure 4:
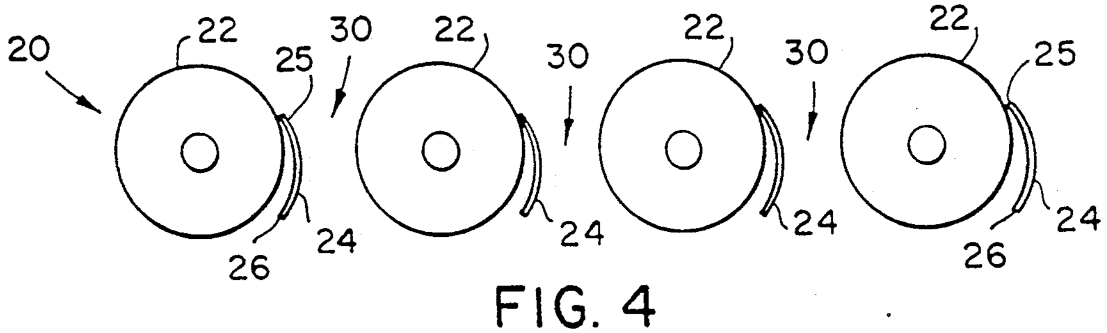
FIG. 4 is a side view of the fragmentary portion of the roller conveyor bed of FIG. 3.

An alternative sizing conveyor 20 is shown in FIGS. 3 and 4. In this embodiment the anti-pinch surface adjacent to each conveyor roller 22 is a stationary elongate curved shield or surface 24 facing convex side outward. The shield 24 is positioned with a straight leading edge 25 adjacent to and along the downwardly turning side of the adjacent convey roller 22 and a trailing end 26 extending between the shielded conveyor roller and the next spaced apart downstream roller. The stationary shield 24 of each upstream roller and the upwardly turning surface of the next spaced apart downstream conveyor roller define the selective sorting spaces 30 for selectively passing objects according to a size dimension.

Figure 5:
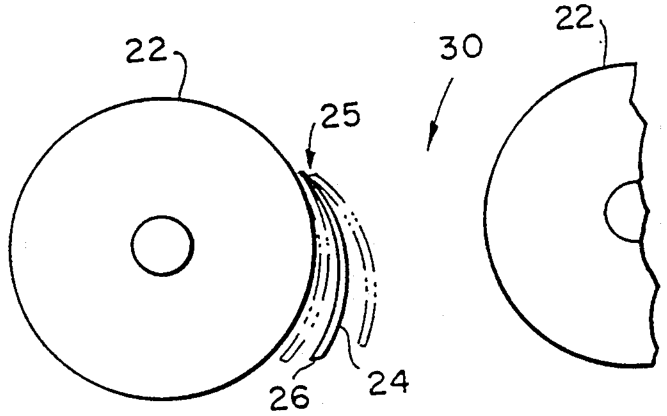
FIG. 5 is a fragmentary diagrammatic side view of two of the spaced apart rollers of the roller conveyor of FIGS. 3 and 4 showing a pivotal mounting of the anti-pinch shield for varying the selective spacing between the rollers.

As shown in FIG. 5 the anti-pinch surface or shield 24 can be movably mounted or pivotally mounted along a pivot axis substantially at or near the leading edge 24 for varying the location of the trailing end 26 and therefore the width of the selective space 30 between adjacent spaced apart conveyor rolls or rollers 22.

Figure 6:
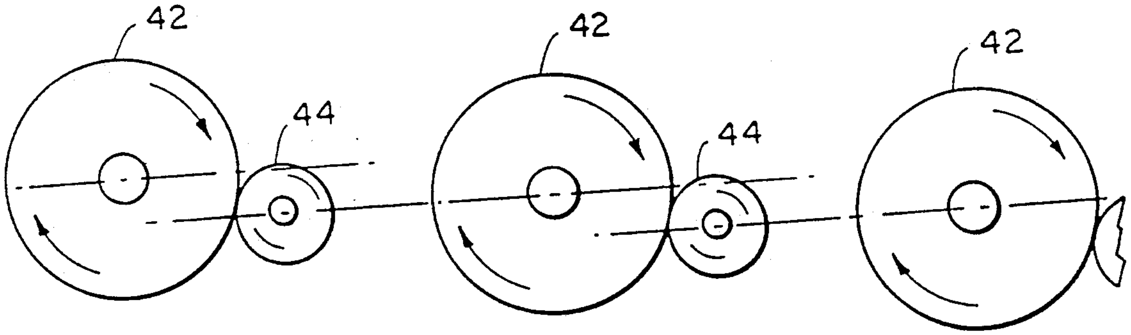
FIG. 6 is a fragmentary diagrammatic side view of another roller conveyor formed by spaced apart pairs of rollers with the conveyor plane inclined downwardly in the downstream direction.

An inclined sizing conveyor roller apparatus 40 is shown diagrammatically in FIG. 6. Pairs of rollers, each pair consisting of a conveyor roller 42 and an anti-pinch roller 44, are arranged with the conveyor rollers 42 defining an inclined plane conveyor surface inclining downwardly in the downstream direction. Each anti-pinch roller 44 of a pair is arranged with axis in the same horizontal plane with the axis of the next spaced apart downstream conveyor roller. The axis of the anti-pinch roller 44 is therefore lower than the axis of the abutting conveyor roller 42 of the pair further removing the anti-pinch roller from interference with the inclined conveyor plane.

Figure 2:
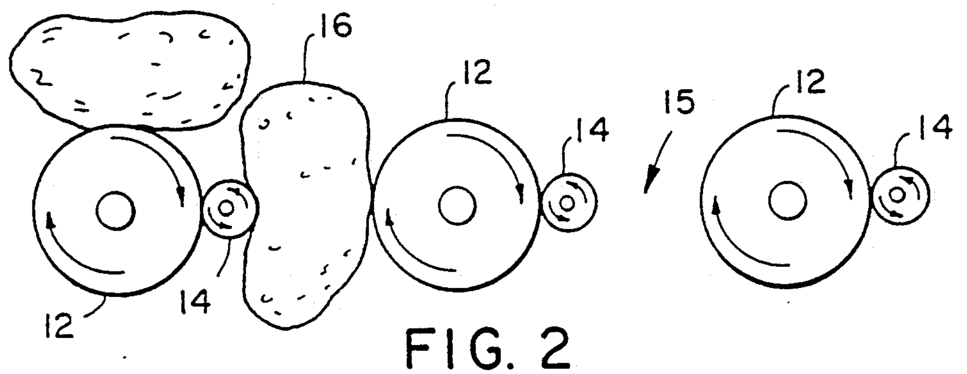
FIG. 2 is a fragmentary diagrammatic side view of a portion of the roller conveyor of FIG. 1 conveying and sorting potatoes and showing the anti-pinch lifting action of the present invention.

In using anti-pinch roller pairs as shown if FIGS. 1, 2 and 6 for sizing potatoes, for example, typical diameters for the conveyor roller and abutting anti-pinch roller respectively are: 4" and 1" (10 cm and 2.5 cm); 4" and ¾" (10 cm and 2 cm); 4" and ⅞" (10 cm and 2.2 cm); or 3 ⅞" and 1"(9 cm and 2.5 cm). In the latter example, the anti-pinch roller may typically be smaller eg. ⅞" or ¾" (2.2 cm or 1.9 cm) in diameter. The size of the selected rollers will also vary according to the size of the produce being sorted and the invention is applicable for onions, oranges, cucumbers, bell peppers, apples, tomatoes, etc. as well as potatoes and other objects.

Figures 7, 7A, 7B, 7C:
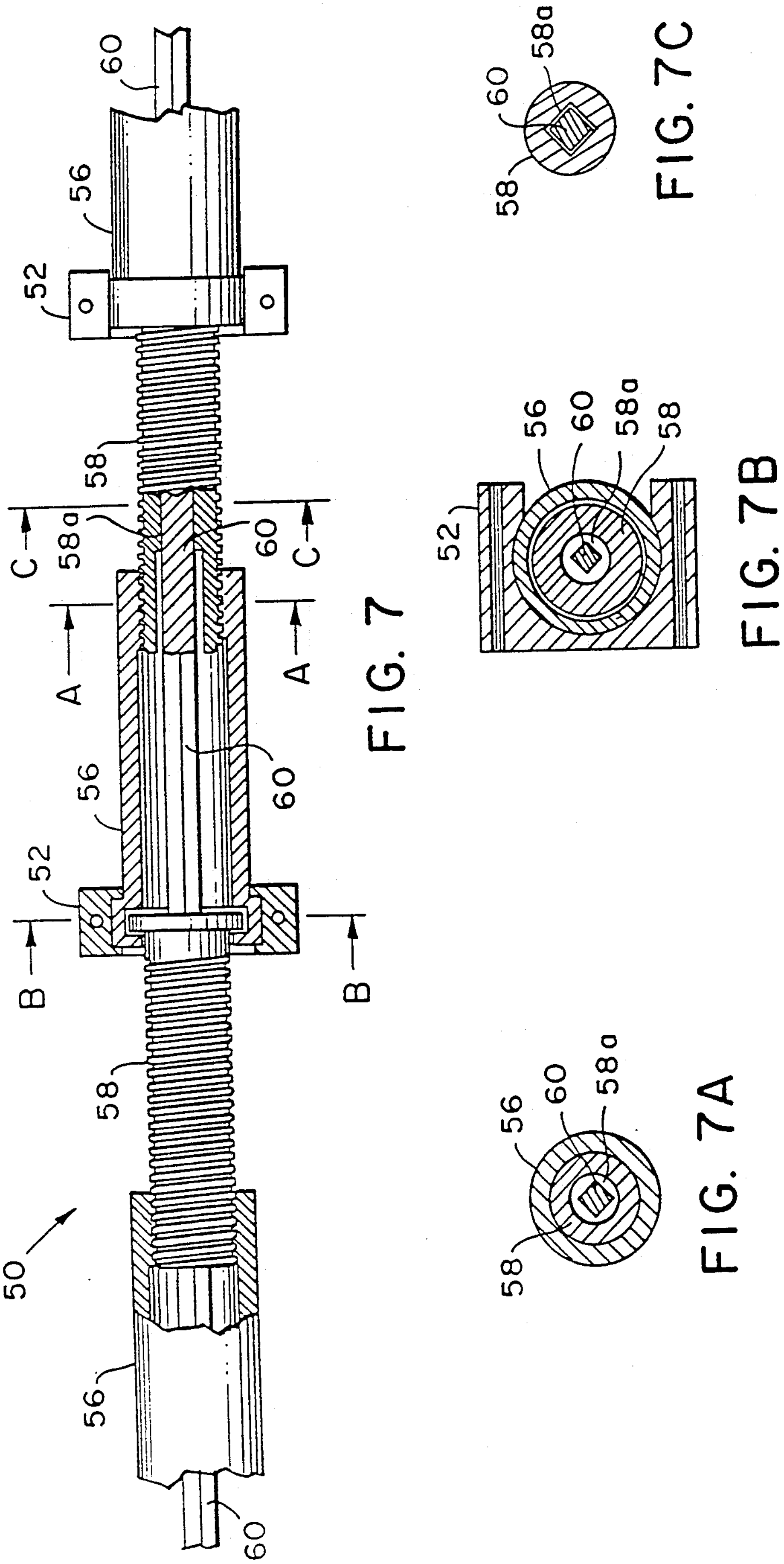
FIG. 7 is a side cross section and partial cut away view of a proportional spacing mechanism for equally or proportionally var the spacing between rollers or roller pairs of the roller conveyor.
FIGS. 7A, 7B and 7C are end cross section views of the proportional spacing mechanism in the direction of the arrows on the respective lines A—A, B—B, and C—C as shown on FIG. 7.
Figure 8:
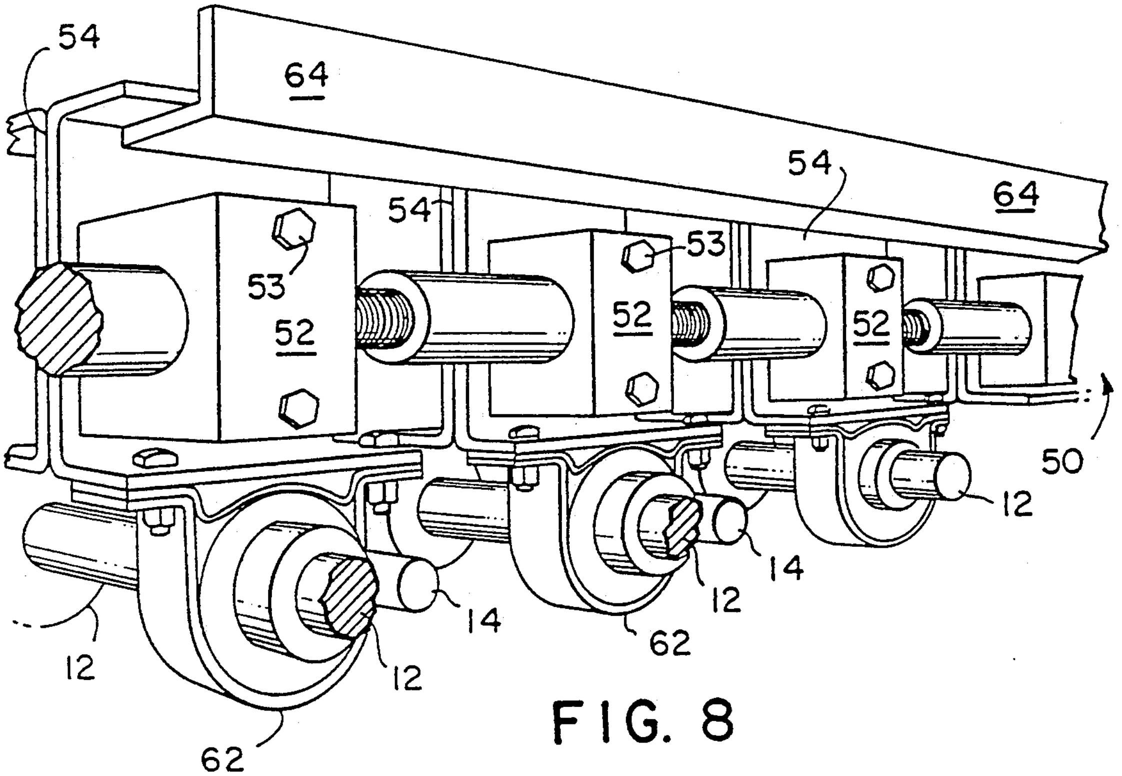
FIG. 8 is a side perspective view of the conveyor housing showing the roller mounts suspended from a track with the coupling elements of a proportional spacing mechanism coupled to the respective roller mounts.
Figure 8A:
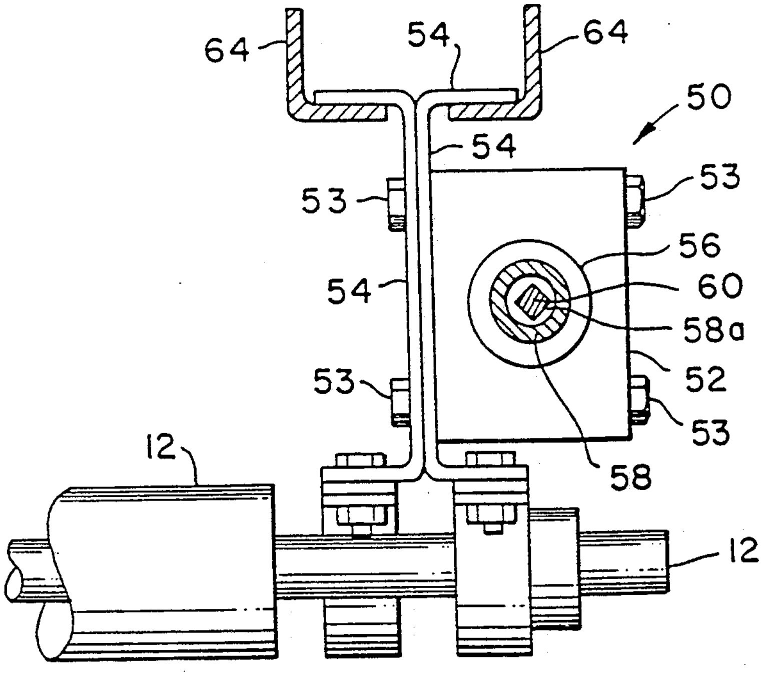
FIG. 8A is a partial cross section through the sliding track or rail showing a suspended roller mount and the proportional spacing mechanism coupled to the roller mount.

A proportional spacing mechanism for adjustably and proportionately equally spacing the shielded rollers or roller pairs from each other is illustrated in FIGS. 7, 7A, 7B, 7C, and in modified form is shown in FIGS. 8 and 8A. The proportional spacing mechanism includes a multi-element shaft 50 along each side of the roller conveyor bed. The multi-element shaft 50 is formed by a plurality of coupling blocks, yokes, or coupling elements 52 which are secured to roll supports, support frames or support hangers 54 by for example bolts 53 as illustrated in FIGS. 8 and 8A.

Each coupling block or coupling element 52 is provided with an internally threaded receiver 56, in this example a sleeve, extending from one side of the coupling block 52 in fixed relationship to the coupling block or yoke 52 and corresponding conveyor roller 12. Extending from the other side of each coupling block 52 in the opposite direction from the internally threaded sleeve 56 is an externally threaded bolt 58 rotationally held by the coupling element 52. The coupling elements are secured together to form the multi-element shaft with the externally threaded bolt 58 extending from one coupling block or yoke 52 engaging the internally threaded receiver 56 of another adjacent coupling block 52.

Each of the bolts 58 of the respective sequential coupling elements 52 is formed with an internal channel including a length of 58*a* of non-circular section, for example square, rectangular, or hexagonal cross section as shown in FIG. 7C. A rod 60 of complementary non-circular cross section such as square, rectangular or hexagonal cross section extends through the bolts 58 of the multi-element shaft 50 for rotating the bolts 58 relative to the receivers or sleeves 56 thereby spacing the coupling blocks 52 and therefore the respective rollers 12 equally and proportionally from a reference position. Thus, one of the rollers 12, roller support hangers 54 and coupling blocks 52 are secured to the roll conveyor bed housing providing the reference position with respect to which all of the other coupling blocks 52 move equally and proportionally upon rotation of the rod 60.

In the example of FIGS. 8 and 8A the rollers 12 are secured to roller supports, support frames or support hangers 54 by pillow block type bearings 62. The roller support hangers 54 are in turn suspended from a track 64 which bears the weight of the rollers. A feature and advantage of this arrangement is that the multi-element shaft 50 cannot and does not support or bear the weight of the conveyor rollers 12. Rather the coupling blocks or coupling elements 52 are secured to the roller support hangers 54 and perform the function of equal or proportionate spacing only without bearing the weight of the objects to be variably spaced. In the Example of FIGS. 8 and 8A, adjacent anti-pinch rollers 14 are supported by adjacent pillow block bearings not visible.

An advantage of the multi-element shaft constructions illustrated in FIG. 7 and in FIG. 8 is that the coupling element externally threaded bolts 58 and internally threaded receivers 56 are formed with threads all turning in the same direction. All of the threads are formed with the same thread gauge or size. The elements are therefore interchangeable. Furthermore all of the bolts 58 turn in the same direction relative to the internally threaded sleeves 56 for turning simultaneously with the shaft 60 producing equal and proportionate spacing from a reference coupling block or reference station on the conveyor bed housing.

Figure 9:
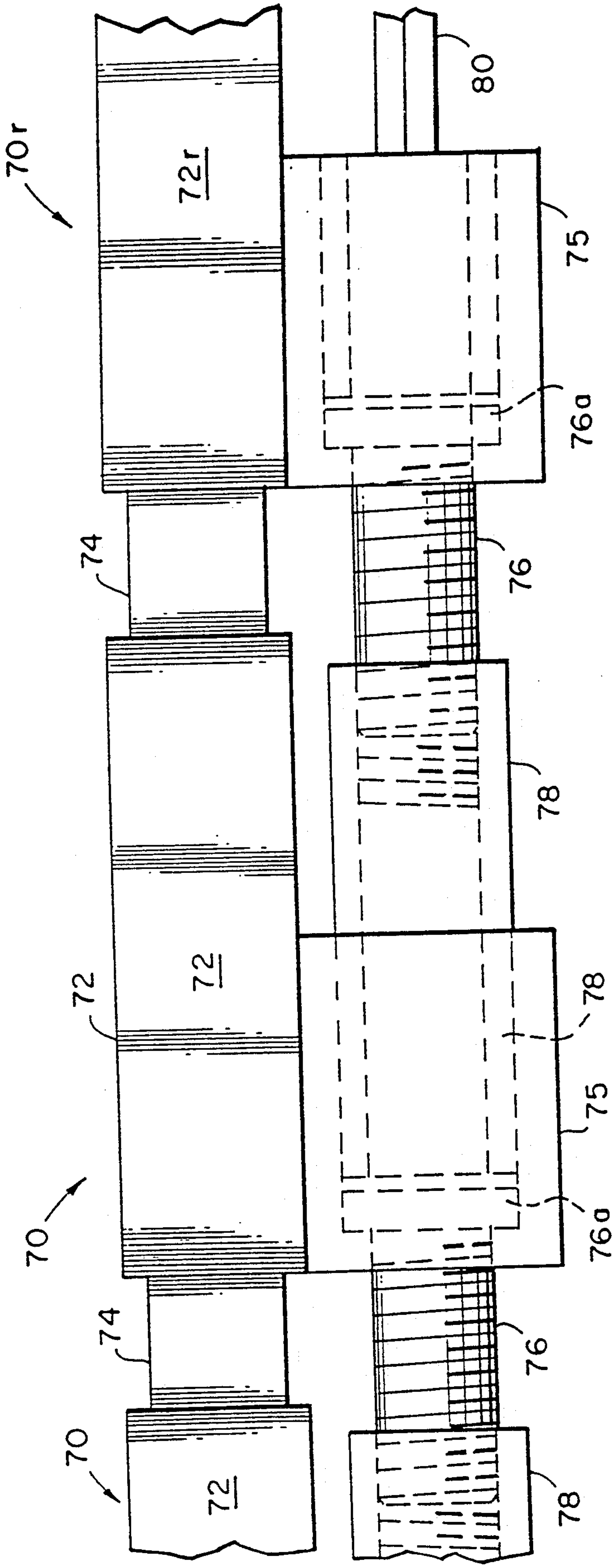
FIG. 9 is a detailed fragmentary side view of another proportional spacing mechanism according to the invention.
Figure 10:
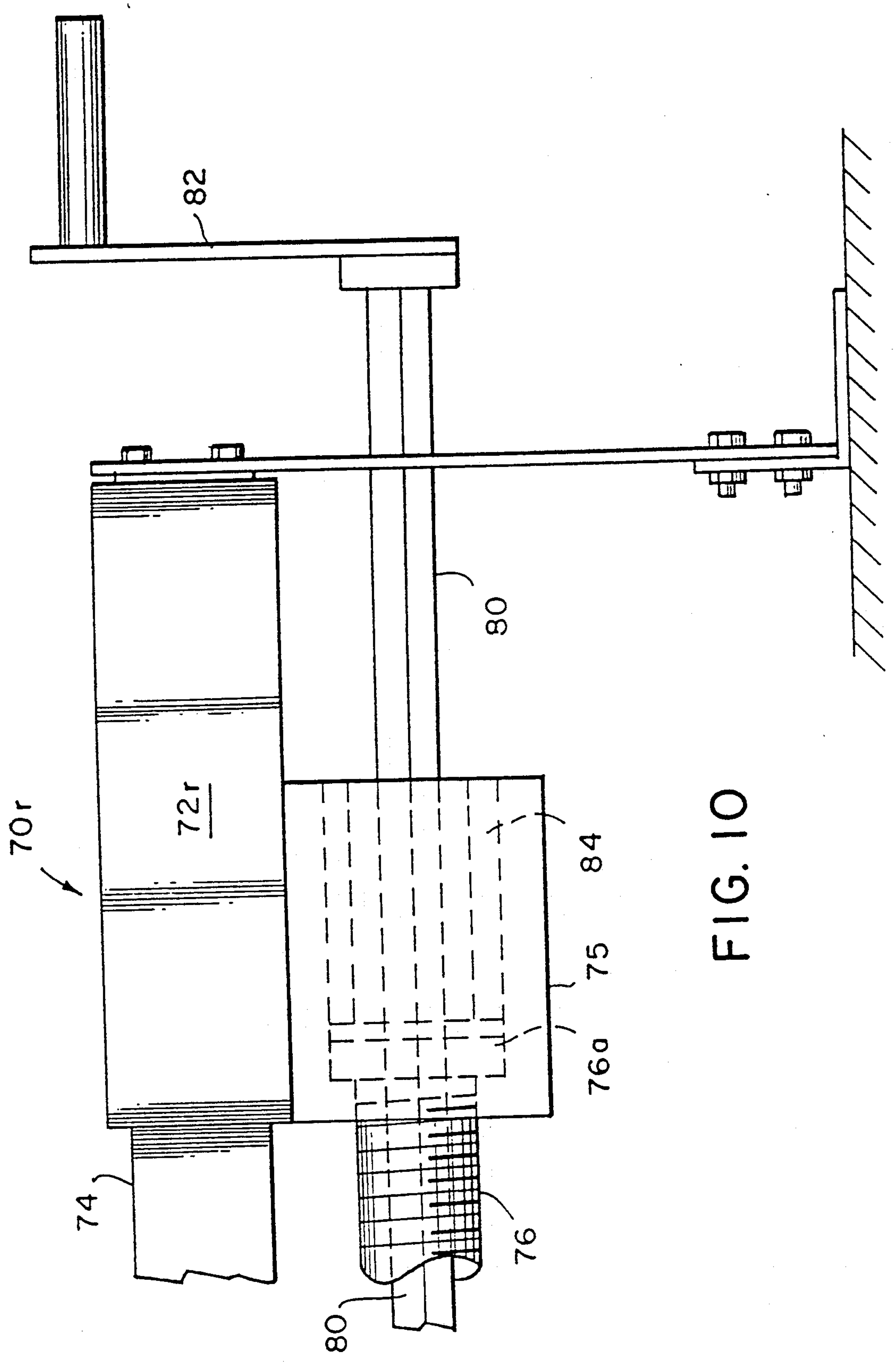
FIG. 10 is a detailed fragmentary side view of the end of the proportional spacing mechanism of FIG. 9.

More generally, another proportional spacing mechanism is illustrated in FIGS. 9 and 10. Each coupling element or assembly 70 includes a sliding carriage or block 72 mounted on a track or weight bearing shaft 74. A bearing element 75 is secured at one side of the coupling element 70 to the sliding carriage 72. The bearing element 75 provides a bearing for rotatably supporting and holding the head of a rotating bolt 76 extending from one side of the coupling member 70 and sliding carriage 72. An internally threaded receiver or receiving element 78 is mounted at the other side of the coupling member 70 and sliding carriage 72 for receiving and engaging the extending bolt 76 from the other side of the next adjacent coupling member 70.

In the example of FIGS. 9 & 10, the internally threaded receiving element 78 is secured in fixed relation to the coupling element by connection to the bearing element 75. Alternatively, the receiver 78 may be mounted in fixed relation to the coupling member 70 by a connection securing it directly to the sliding carriage 72 at the end opposite bearing member 75.

As shown in FIG. 10, a shaft or rod 80 of non-circular cross section extends simultaneously through the aligned bolts 76 of multiple coupling elements or members 70 for engaging the bolts at channel lengths of non circular complementary cross section. Rotating the crank 82 simultaneously rotates the bolts 76 for pushing and pulling the coupling element sliding the carriages 72 on track 74 relative to a stationary reference coupling element **70*r* and reference carriage 72*r*. The stationary reference may be located for example at one end as shown in FIG. 10** or at an intermediate location.

The head **76*a* of each bolt 76 is confined during rotation within the bearing element 75 by the end of the bearing element on one side and the tubular end of receiver 78 on the other side. The receiver element is cemented or otherwise fixed to the bearing element 75. A variety of other arrangements may of course be used for plugging the opening in bearing element 75 once the rotating bolt 76 has been inserted in place. For example if a short internally threaded receiver element is used cemented, welded or secured directly to the end of carriage 72, then a separate plug 84 is set in the opening of bearing element 75 to confine the bolt head 76*a*** while leaving sufficient space for free rotation.

While the invention has been described with reference to particular example embodiments it is intended to cover all modifications and equivalents within the scope of the following claims.

I claim:

1. A proportional spacing mechanism for proportionally spacing objects comprising:
   - a plurality of coupling means coupled respectively to the objects, each coupling means comprising an internally threaded receiver on one side of the coupling means in fixed relationship to the coupling means and an elongate externally threaded bolt coupled for relative rotation to the coupling means and extending from a side opposite said one side of the coupling means;
   - said plurality of coupling means being coupled together with the externally threaded bolt of one coupling means engaging the internally threaded receiver of another coupling means effectively forming a multi-element shaft;
   - said bolts being formed with an internal channel having a length of non-circular cross section;
   - and a rod of complementary non-circular cross section extending through the bolts for engaging and rotating the bolts relative to the receivers thereby spacing the coupling means and respective objects proportionally from a reference position.

2. The improved sizing apparatus of claim 1 comprising track means constructed and arranged for slideably bearing the weight of the objects, said coupling means of the proportional spacing mechanism being coupled to the respective objects without bearing the weight of said objects.

* * * * *